United States Patent [19]
Martin

[11] Patent Number: 6,120,212
[45] Date of Patent: Sep. 19, 2000

[54] MARINE PIPELAYING AND HANDLING OF RIGID PIPELINES

[75] Inventor: Robert George Martin, Aberdeen, United Kingdom

[73] Assignee: Coflexip Stena Offshore Ltd., United Kingdom

[21] Appl. No.: 09/077,256

[22] PCT Filed: Nov. 25, 1996

[86] PCT No.: PCT/GB96/02905

§ 371 Date: Nov. 4, 1998

§ 102(e) Date: Nov. 4, 1998

[87] PCT Pub. No.: WO97/20160

PCT Pub. Date: Jun. 5, 1997

[30] Foreign Application Priority Data

Nov. 24, 1995 [GB] United Kingdom .................. 9524087

[51] Int. Cl.[7] ................ F16L 1/14; F16L 3/02; F16L 3/18
[52] U.S. Cl. ............... 405/158; 405/166; 405/168.3; 405/168.4
[58] Field of Search .................. 405/154, 158, 405/164, 165, 166, 168.4, 168.3

[56] References Cited

U.S. PATENT DOCUMENTS

| | | | |
|---|---|---|---|
| 3,775,987 | 12/1973 | Rochelle et al. | 405/166 |
| 3,950,955 | 4/1976 | Meeres | 405/158 |
| 4,531,391 | 7/1985 | Engman | 72/10 |
| 5,044,825 | 9/1991 | Kaldenbach | 405/166 |
| 5,094,340 | 3/1992 | Avakov | 498/626.1 |
| 5,893,682 | 4/1999 | Oliveri | 405/166 |

FOREIGN PATENT DOCUMENTS

| | | |
|---|---|---|
| 0486324 | 5/1992 | European Pat. Off. . |
| 9612908 | 5/1996 | WIPO . |

*Primary Examiner*—David Bagnell
*Assistant Examiner*—Tara L. Mayo
*Attorney, Agent, or Firm*—Ostrolenk, Faber, Gerb & Soffen, LLP

[57] ABSTRACT

A support elelment (12) for supporting a rigid pipeline (10) during plastic bending of the pipeline has a transverse cross-sectional configuration such that, in use, a pipeline supported by the support element contacts said support element is at least first and second points (14, 16) disposed substantially symmetrically on either side of the plane of bending, the points of contact being arranged such that resultant forces between the pipeline and the support element act at points which are disposed substantially symmetrically about the plane of bending and which are spaced apart by an angle a greater than 90° and less than 180° around the cross-sectional circumference of the pipeline. The angle a is selected so as to minimize ovalisation for a pipeline of given material, diameter and wall thickness, and for a given bend radius and pipeline tension, or to provide useful modification of ovalisation over ranges of these parameters. For most practical applications, the optimal angle a will e greater than 90° and less than or equal to 150° . In preferred embodiments of the invention, the angle a is greater than 90° and less than or equal to 110°.

11 Claims, 2 Drawing Sheets

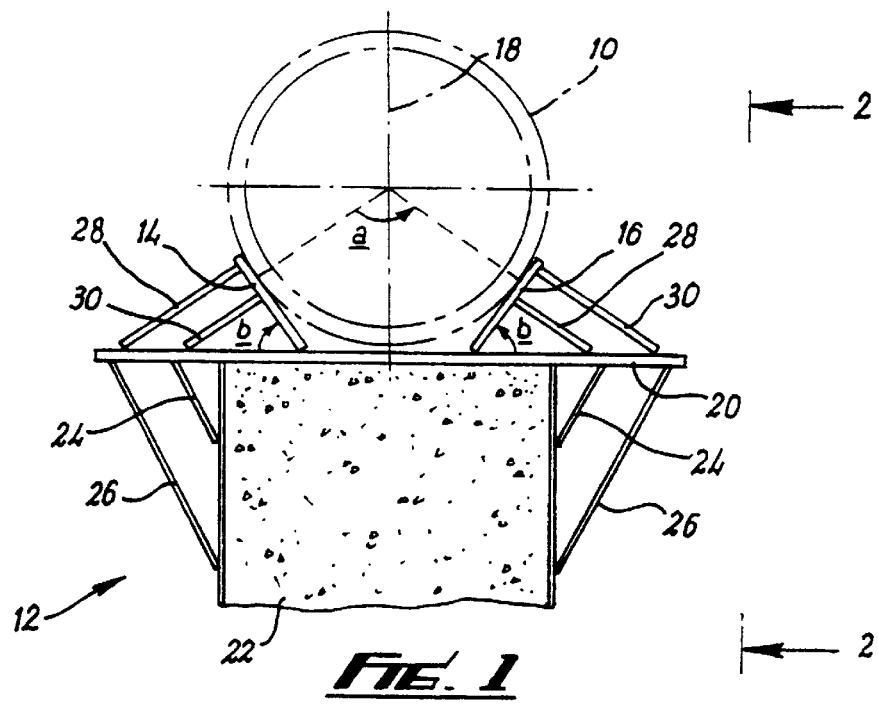
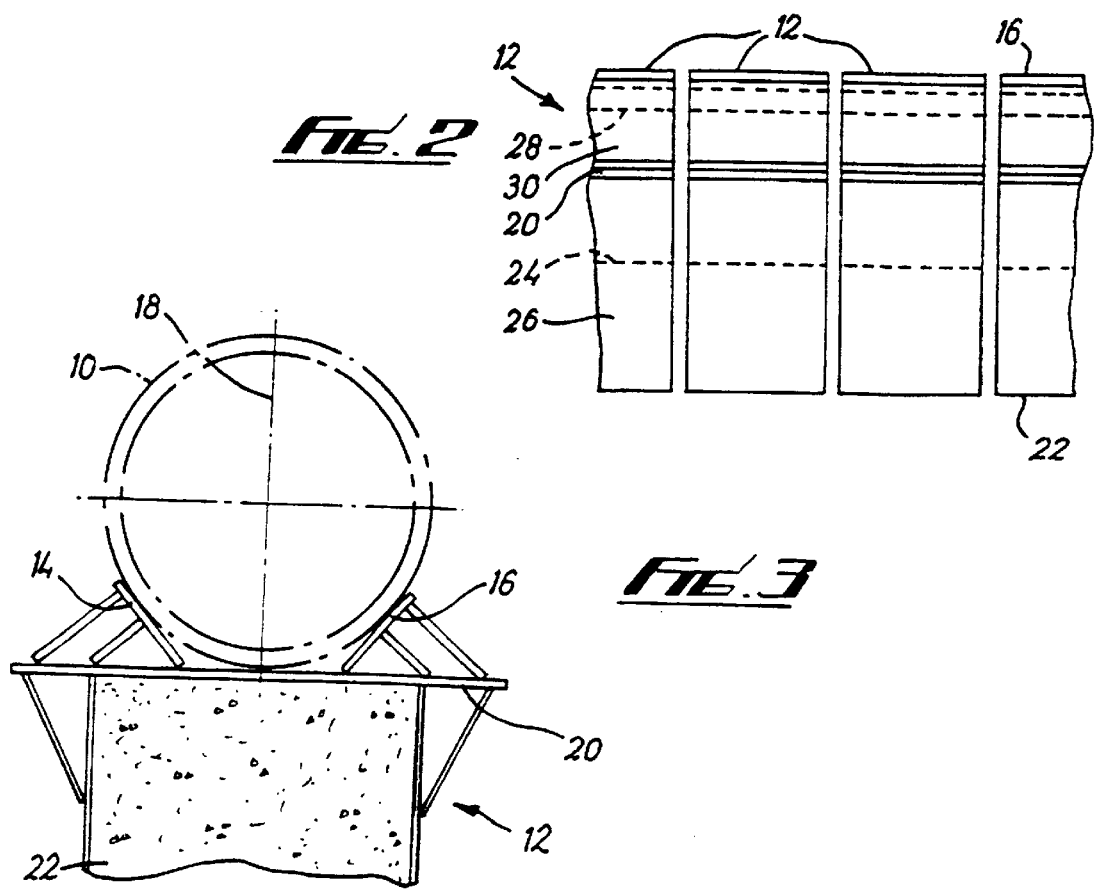

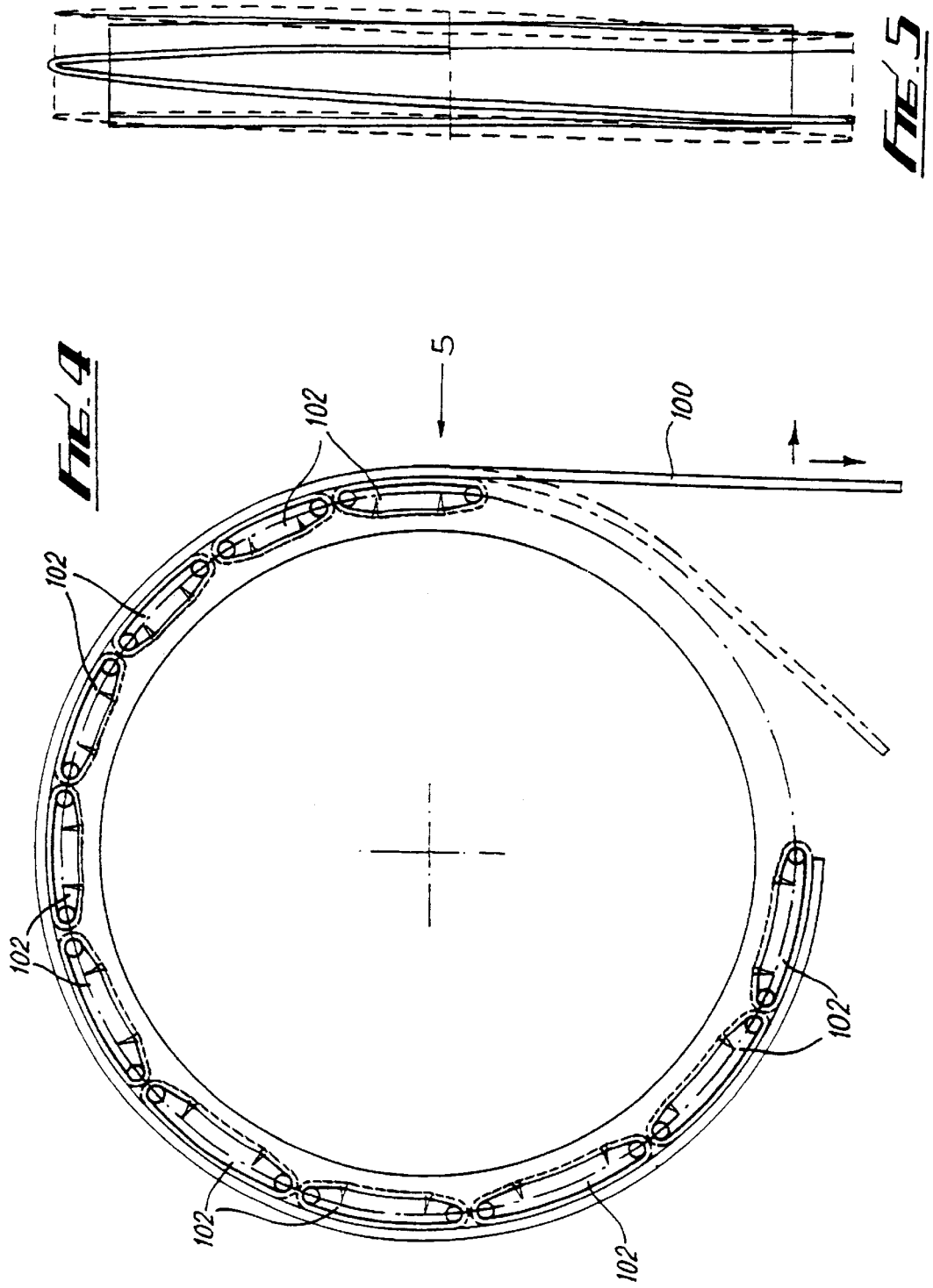

MARINE PIPELAYING AND HANDLING OF RIGID PIPELINES

BACKGROUND OF THE INVENTION

The present invention relates to improvements in or relating to marine pipelaying methods and apparatus. The invention is particularly concerned with controlling the ovality of rigid pipeline during pipelaying operations in which the pipeline is plastically deformed during bending of the pipeline around an arcuate path and is subsequently straightened prior to laying.

The invention will be discussed herein with particular reference to rigid steel pipe, but is also applicable to rigid pipe formed from other materials.

Rigid steel pipe is manufactured to a nominal circular diameter. However, in practice the pipe will not be perfectly circular along its entire length, but will exhibit variations in ovality, within defined tolerances. Subsequent processing of the pipe, such as by bending, will cause further variations in ovality. In the context of marine pipelaying, ovality affects the ability of the pipe to resist hydrostatic pressure, particularly at extreme water depths, and it is important that the ovality of the pipe as finally laid does not exceed predetermined limits. Ovalisation of the pipe may become particularly significant where the pipe is being laid in relatively great water depths requiring unusually high tension to be applied to the pipeline, thereby increasing the forces exerted between the pipeline and an underlying pipe bearing surface, prior to the launch of the pipeline from the vessel.

Ovality may be defined as:

$$\text{Ovality} = D_{max} - D_{mean}/D_{mean};$$

where $D_{max}$ is the maximum diameter of the pipe and $D_{mean}$ is the mean diameter of the pipe. In a given length of pipe, the angle formed between the maximum diameter (or "major axis") and a reference plane extending through the longitudinal axis of the pipe may vary along the length of the pipe. Typically, the maximum diameter may rotate along the length of the pipe so that the ovality spirals along the pipe.

In the present discussion the following conventions will be employed:

- where the major axis of the pipe lies along the reference plane the ovality will be referred to as a positive ovality; in this case, the diameter along the reference plane is greater than the nominal circular diameter;
- where the major axis lies at right angles to the reference plane the ovality will be referred to as a negative ovality; in this case the diameter along the reference plane will be less than the nominal circular diameter;
- in cases where the pipe is being bent around an arcuate path the reference plane will be the plane of curvature of the pipe.

It can readily be seen that where the pipe exhibits positive ovality prior to bending of the pipe, the ovality of the pipe will be reduced by such bending, since the process of bending will tend to increase the diameter at right angles to the plane of bending and to reduce the diameter in the plane of bending. Conversely, where the pipe exhibits negative ovality prior to bending, the ovality will be increased by bending.

Where the pipe is bent elastically, it can be expected to return to its original ovality when the bending forces are removed. However, where the pipe is plastically deformed during bending and is subsequently straightened, the pipe will not fully recover its original ovality and there will be a net residual change in its final ovality as compared with its ovality prior to bending. Where the original ovality is positive, the net residual change will result in a reduced positive ovality. Where the original ovality is negative, the net residual change will result in an increased negative ovality. In the latter case it can be seen that there may be cases where a length of pipe which is within predetermined ovality tolerances prior to bending might exceed such tolerances after bending and straightening owing to the net increase in negative ovality. In the former case the net decrease in positive ovality will generally be desirable.

It will be understood that, where the pipe is bent against a supporting surface, there will also be a degree of flattening of the pipe. Herein, such flattening is considered to be a component of the overall ovalisation.

The present invention is primarily concerned with controlling pipeline ovalisation in marine pipelaying operations where the pipe is subject to plastic deformation during bending and subsequent straightening in the course of the laying operation. Such plastic deformation occurs both in pipelay systems where a continuous length of pipeline is assembled onshore and is spooled onto a reel, the pipe being unspooled from the reel, plastically bent around an arcuate path to a desired launch angle and straightened as it is laid from the lay vessel. Plastic deformation also occurs in a variation of "stovepipe" operations in which joints of pipe are assembled into a continuous pipe on board the vessel and in which the assembled pipe is plastically bent around an arcuate path and subsequently straightened in order to achieve a desired launch angle of the pipe from the vessel. Reel pipelaying systems of the former type are utilised by the vessel "Stena Apache" and are described in detail in, for example, U.S. Pat. Nos. RE30846, 4,260,287, 4,230,421 and 4,297,054. Pipelay systems of the latter type are described in co-pending International Patent Applications Nos. PCT/GB95/00573 and PCT/GB95/00574 in the name of the present assignee.

In both of these cases, the arcuate path around which the pipe is bent is typically defined by a plurality of pipe support pads. In order to prevent relative movement between the pipeline and the pipeline contacting portions of the pads, such pads might be mounted on endless-belt type tracks or on a rotatable wheel-like structure, such that the pads move with the pipe, or might be static and include pipe-contacting roller bearings. Arrangements of these general types are known in the art. In the case of the rotatable wheel-like structure referred to above, the pipe supporting surface might comprise a continuous, circular rim of the structure, rather than a plurality of discrete pads. References to "support pads" and "support elements" used herein will be understood to include such arrangements.

When a pipeline contacts such support pads under tension, the reaction force between the pipeline and the support tends to deform the pipeline towards negative ovality, and may also result in the formation of flats on the pipeline surface. It is an object of the present invention to provide improved pipeline support pads which reduce the tendency for ovalisation of the pipeline and/or reduce flat-formation.

SUMMARY OF THE INVENTION

In accordance with a first aspect of the invention there is provided a support element for supporting a rigid pipeline during plastic bending of said pipeline in a plane of bending including the longitudinal axis of said pipeline, said support element having a transverse cross-sectional configuration such that, in use, a pipeline supported by the support element contacts said support element at at least first and second points disposed substantially symmetrically on either side of the plane of bending, wherein said points of contact are arranged such that resultant forces between the pipeline and the support element act at points which are disposed substantially symmetrically about said plane of bending and which are spaced apart by an angle a greater than 90° and less than 180° around the cross-sectional circumference of said pipeline.

Preferably, the angle a is selected so as to minimise ovalisation for a pipeline of given material, diameter and wall thickness, and for a given bend radius and pipeline tension, or to provide useful modification of ovalisation over ranges of these parameters.

Preferably also, the support element is arranged so as to prevent contact between the pipe and an underlying support at the point on the external surface of the pipe where intersected by the plane of bending on the inside of the bend.

Preferably also, the angle a is no greater than about 170°.

For most practical applications, the optimal angle a will be greater than 90° and less than or equal to 150°. In preferred embodiments of the invention, said angle a is greater than 90° and less than or equal to 110°.

Preferably, said element comprises first and second pipe-contacting portions disposed symmetrically on either side of said plane of bending.

In one embodiment, said pipe contacting portions comprise generally planar members disposed on either side of said plane of bending. Preferably, the planar members are each braced by first and second diagonal bracing members extending between the outer surfaces of said planar members and an underlying support structure.

In accordance with a second aspect of the invention, there is provided a pipeline support structure comprising a series of pipeline support means defining a pipeline path, in which said pipeline support means comprise or include support elements in accordance with the first aspect of the invention. Preferably, said support means define an arcuate path. Most preferably, said support means each comprises a roller track assembly including an endless track having a plurality of pipeline support pads disposed along its length, said support pads comprising support elements in accordance with the first aspect of the invention.

BRIEF DESCRIPTION OF THE DRAWINGS

Embodiments of the invention will now be described, by way of example only, with reference to the accompanying drawings in which:

FIG. 1 is a schematic end view of a first, embodiment of a support element in accordance with the present invention;

FIG. 2 is a schematic side view of a plurality of elements as shown in FIG. 1 viewed in the direction 2—2 of FIG. 1;

FIG. 3 is schematic end view of a second embodiment of a support element in accordance with the invention;

FIG. 4 is a schematic side view of a pipeline passing around a pipe diverter sheave of a pipelaying vessel illustrating the application of the invention thereto;

FIG. 5 is an edge view in the direction of arrow 5 in FIG. 4.

DESCRIPTION OF THE PREFERRED EMBODIMENTS

Referring now to the drawings, FIG. 1 shows a tubular member such as a pipeline 10, indicated in phantom lines, mounted on a support element 12 in accordance with the invention. The pipeline 10 is supported by first and second pipe-contacting members 14, 16 of the support element 12. In this example, the pipe-contacting members 14, 16 comprise generally planar plate members which are disposed symmetrically on either side of a plane 18 extending along the longitudinal axis of the pipeline 10 and the plate members diverging upwardly on either side of the pipeline 10. For the purposes of the present invention, the plane 18 is the plane in which the pipeline 10 will be bent. The plane of bending is most likely to be vertical but for some pipelay systems may be horizontal or at some other angle. References herein to "vertical" and "horizontal" orientations will be understood as relating to the illustrated examples, and may vary according to the orientation of the plane of bending.

The pipe-contacting members 14, 16 are mounted on a horizontal support plate 20 at equal and opposite angles b thereto. In this example, the angle b is 55°, and the members 14, 16 are arranged such that a pipe of predetermined diameter will rest on the members 14, 16 without contacting the horizontal plate 20. The pipe 10 thus contacts the members 14, 16 at first and second points spaced apart around its lower circumference by an angle a, equal to 2b, which in this case is 110°.

The members 14, 16 thus define a V-section "support pad" with an internal angle of (180°–2b); i.e. 70° in this example. V-section pipeline support pads are known as such, typically having an internal angle of about 120°, corresponding to angles b=30°; i.e. angle a=60°.

FIG. 3 shows an alternative embodiment of the invention in which the angle b is 50°, the corresponding angle a being 100°.

In accordance with the invention, the angle a is selected to be greater than 90°, (ie, the internal angle of the V-section is less than 90°) such that the ovalising components of the reactive forces exerted on the pipe 10 by the members 14, 16 cancel one another (to an extent depending on the angle a and the pipelay parameters—principally, the pipe material, diameter and wall thickness, the applied tension and the radius of pipe bending) or act in a direction which tends to deform the pipe 10 towards positive ovality.

If the pipe simply rested on the horizontal plate 20, then the reactive force acting on the bottom-most point of the pipe cross-section would obviously tend to deform the pipe 10 towards negative ovality. If the pipe rests on a conventional V-section pad with an internal angle greater than 90° then the negatively ovalising force components will be reduced, but will still tend to deform the pipe towards negative ovality.

Making angle a equal to 90° is a special case in which the ovalising force components can be seen to cancel completely, by superposition of the force components. This has been found to be true for rigid pipeline which is bent elastically. However, it has been found that, for rigid pipeline which is bent plastically, it is preferable that the support pads are configured such that a is greater than 90°. Bending the pipe around an arcuate path itself tends to deform the pipe towards negative ovality, as previously mentioned. This effect can be reduced or cancelled by selecting the angle a such that the ovality inducing force components produced by contact with the support pads oppose the negative ovalisation induced by bending. If the radius of curvature of the path varies along its length then the configuration of a series of pads defining the path may also be arranged such that the angle a varies accordingly.

The optimal value of the angle a is best determined empirically for a particular pipelay scenario, being dependent, as aforesaid, on the parameters of the pipeline, the pipelay apparatus and the particular pipelay operation. Tests conducted by the assignee hereof suggest that, for most practical purposes, the optimal angle a will be greater than 90° and less than or equal to 150°. For relatively large diameter, thick-walled pipeline of the type employed in deepwater pipelay operations, the optimal angle is likely to be greater than 90° and less than 110°, assuming that the pipe is bent to radius close to the minimum acceptable radius of curvature for the particular pipeline. Generally speaking, the optimal angle a will be greater where the tendency towards ovalisation of the pipeline is greater. The tendency to ovalisation induced by plastic bending has been found generally to increase with increasing pipe diameter, decreasing bend radius and decreasing wall thickness. It has also been found that increased pipeline tension appears to reduce ovalisation during plastic bending.

In the illustrated embodiments, the horizontal plate 20 is supported in turn by an underlying structure 22 configured to be capable of withstanding whatever forces may be encountered in use. In this case the underlying structure includes diagonal bracing plates 24, 26 which support the outer lateral portions of the horizontal plate. The pipe-contacting members 14, 16 are similarly braced by support plates 28, 30, which engage the outer surfaces of the members 14, 16 on either side of the points at which the pipe contacts the members 14, 16. This arrangement allows a degree of flexibility in the members 14, 16, enabling them to deform slightly around their pipe-contact points. This reduces any tendency for flats to form on the outer surface of the pipe 10 as a result of contact with the members 14, 16.

It will be understood that if the angle a was equal to or greater than 180° then the pipeline would rest on the underlying support structure unless held by frictional contact with the pipe contacting members 14, 16. Accordingly, for the purposes of the invention the angle a must be less than 180°. For most purposes, the angel a will be such as to support the pipe so as to prevent contact between the pipe and the underlying support at the point on the external surface of the pipe where intersected by the plane of bending on the inside of the bend. For this purpose, the angle a should preferably be no greater than about 170°. In some circumstances, particularly where the angle a is greater than this, it may be desirable for there to be contact with the underlying support.

It will be appreciated that the structural details of support pads in accordance with the invention may be varied widely from those of the presently described embodiments. The pipe-contacting surfaces of the pipe-contacting members need not be planar or platelike, so long as they are configured in such a way that the points of contact between the members and the pipeline are arranged such that resultant forces between the pipe and the support elements act at points which are disposed substantially symmetrically about the plane of bending 18 and which are spaced apart by an angle a greater than 90° and less than 180° around the cross-sectional circumference of the pipeline. Similarly, the underlying structure of the support pad may be varied to suit particular applications.

FIG. 4 illustrates an example of a pipeline diverter structure in which the present invention might be employed. In this example the purpose of the diverter structure is to divert a pipeline 100, which is initially fabricated along a horizontal axis on the deck of a vessel upon which the diverter structure is mounted, from its initial horizontal orientation to a final launch angle. The pipeline 100 is plastically deformed around an arcuate path as it passes in the clockwise direction around the structure before departing therefrom at the desired launch angle (approximately 90° in this case)

The arcuate path of the diverter structure is defined, in this instance, by a plurality of roller track assemblies 102, mounted on a suitable support structure (not shown). The roller track assemblies each comprises a chassis having sprocket wheels at either end around which an endless belt or track is arranged. Roller track assemblies of this general type are well known in the art and will not be described in greater detail herein. Such assemblies are typically used in pipe straightening and/or tensioning apparatus. The endless track may be driven or idle, depending upon the application, and the pipe contacting surface of the track is fitted with a series of pipe support pads. The present invention may be employed in place of conventional support pads in roller track assemblies of this type.

It will be appreciated that pipe support elements configured in accordance with the present invention might be employed in place of any existing type of pipe support, but the invention is particularly applicable in situations where the pipe is bent while under relatively high tension.

Improvements or modifications may be incorporated without departing from the scope of the invention.

What is claimed is:

1. A support element for supporting a rigid pipeline during plastic bending of said pipeline in a plane of bending including the longitudinal axis of said pipeline, said support element comprising first and second pipe-contacting portions disposed symmetrically on either side of said plane of bending, said pipe-contacting portions defining a transverse cross-sectional configuration such that, in use, a pipeline supported by the support element contacts said first and second pipe-contacting portions at at least respective first and second points disposed substantially symmetrically on either side of the plane of bending, wherein said points of contact are arranged such that resultant forces between the pipeline and the pipe-contacting portions act at points which are disposed substantially symmetrically about said plane of bending; wherein said points of contact are spaced apart by an angle a greater than 90° and less than 180° around the cross-sectional circumference of said pipeline.

2. A pipeline support element as claimed in claim 1, wherein the angle a is selected so as to minimize ovalisation for a pipeline of given material, diameter and wall thickness, and for a given bend radius and pipeline tension, or to provide useful modification of ovalisation over ranges of said material, diameter, wall thickness, bend radius and pipeline tension.

3. A pipeline support element as claimed in claim 1, wherein the pipe-contacting portions are arranged to support the pipeline so as to prevent contact between the pipeline and an underlying support at the point on the external surface of the pipe where intersected by the plane of bending, on an inner, concave side of the bend.

4. A pipeline support element as claimed in claim 1, wherein the angle a is no greater than about 170°.

5. A pipeline support element as claimed in claim 1, wherein the angle a is greater than 90° and less than or equal to 150°.

6. A pipeline support element as claimed in claim 5, wherein said angle a is greater than 90° and less than or equal to 110°.

7. A support element as claimed in claim 1, wherein said pipe contacting portions comprise generally planar members disposed on either side of said plane of bending.

8. A pipe support element as claimed in claim 7, wherein the planar members are each braced by first and second diagonal bracing members extending between the outer surfaces of said planar members and an underlying support structure.

9. A pipeline support structure comprising a series of pipeline support means defining a pipeline path, in which said pipeline support means comprise support elements as claimed in claim 1.

10. A pipeline support structure as claimed in claim 9, wherein said support means define an arcuate path.

11. A pipeline support structure as claimed in claim 9, wherein said support means each comprises a roller track assembly including an endless track having a plurality of pipeline support pads disposed along its length, said support pads comprising said support elements.

* * * * *